(12) United States Patent
Purdy et al.

(10) Patent No.: US 8,490,546 B2
(45) Date of Patent: Jul. 23, 2013

(54) METHOD OF IMAGING IN CRYSTALLINE COLLOIDAL ARRAYS

(75) Inventors: Sean Purdy, Cincinnati, OH (US); Jessica M. Williamson, Cincinnati, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 376 days.

(21) Appl. No.: 12/916,707

(22) Filed: Nov. 1, 2010

(65) Prior Publication Data

US 2012/0103211 A1    May 3, 2012

(51) Int. Cl.
*B41F 23/04*    (2006.01)

(52) U.S. Cl.
USPC .............. 101/487; 101/483; 523/223

(58) Field of Classification Search
USPC ...... 101/129, 170, 483, 487, 488, 491; 523/1, 523/223; 264/1.7, 1.9
See application file for complete search history.

(56) References Cited

U.S. PATENT DOCUMENTS

| | | | |
|---|---|---|---|
| 6,894,086 B2 | 5/2005 | Munro et al. | |
| 7,184,569 B2 * | 2/2007 | Lawandy et al. | 382/100 |
| 7,682,530 B2 | 3/2010 | Purdy et al. | |
| 8,168,355 B2 * | 5/2012 | Purdy et al. | 430/9 |
| 2002/0054680 A1 * | 5/2002 | Huang et al. | 380/54 |
| 2003/0125416 A1 * | 7/2003 | Munro et al. | 523/171 |
| 2007/0165903 A1 * | 7/2007 | Munro et al. | 382/100 |
| 2009/0155545 A1 | 6/2009 | Purdy et al. | |
| 2010/0308570 A1 * | 12/2010 | Heim | 283/67 |

FOREIGN PATENT DOCUMENTS

WO    2010020054    2/2010

OTHER PUBLICATIONS

Asher, Sanford A. et al., "Self-Assembly Motif for Creating Submicron Periodic Materials. Polymerized Crystalline Colloidal Arrays", Journal of the American Chemical Society; Jan. 24, 1994; pp. 4997-4998; vol. 116, No. 11; American Chemical Society.

\* cited by examiner

*Primary Examiner* — Ren Yan
(74) *Attorney, Agent, or Firm* — Julie W. Meder

(57) ABSTRACT

A method of printing an image that diffracts radiation is disclosed. The method includes assembling an ordered periodic array of particles on a substrate, wherein the array of particles diffracts radiation in a wavelength band dependent on viewing angle; printing an imaging composition onto a portion of the array in a configuration of an image; shifting the wavelength band of radiation diffracted and changing the refractive index by the printed portion of the array so that the printed portion diffracts radiation at a different wavelength band and reflectivity intensity from a remaining portion of the array; and fixing the printed portion of the array, such that the printed portion of the array diffracts radiation and exhibits the image.

14 Claims, No Drawings

METHOD OF IMAGING IN CRYSTALLINE COLLOIDAL ARRAYS

FIELD OF THE INVENTION

This invention relates to printing images using crystalline colloidal arrays, more particularly, to creating images in crystalline colloidal arrays by printing an imaging composition onto a crystalline colloidal array.

BACKGROUND OF THE INVENTION

Radiation diffractive materials based on crystalline colloidal arrays have been used for a variety of purposes. A crystalline colloidal array (CCA) is a three-dimensional ordered array of mono-dispersed colloidal particles.

Such colloidal dispersions of particles can form crystalline structures having lattice spacings that are comparable to the wavelength of ultraviolet, visible or infrared radiation. These crystalline structures have been used for filtering narrow bands of selected wavelengths from a broad spectrum of incident radiation, while permitting the transmission of adjacent wavelengths of radiation. Prior devices have been created by dispersing particles in a liquid medium, whereby the particles self-align into an ordered array. The particles are fused together by mutual polymerization or by introducing a solvent that swells and fuses the particles together.

In other uses of CCAs, an ordered array is fixed in a matrix and may be used as a colorant when the fixed array diffracts radiation in the visible spectrum. Alternatively, CCAs are fabricated to diffract radiation for use as optical filters, optical switches, and optical limiters. While these CCAs use constant inter-particle spacing, a CCA may also function as a sensor when the inter-particle spacing varies in response to stimuli.

More recently, CCAs have been used to exhibit images as described in U.S. Patent Application Publication No. 2009/0155545, incorporated herein by reference. An image is produced by exposing one portion of a CCA to radiation and altering another portion of the CCA, such that the first portion and the other portion diffract radiation at different wavelengths, rendering the image detectable. The first portion may correspond to the image with the second serving as a background, or vice versa, wherein the first portion is a background to an image produced in the second portion.

SUMMARY OF THE INVENTION

The present invention is directed to a method of printing an image that diffracts radiation comprising assembling an ordered periodic array of particles on a substrate, wherein the array of particles diffracts radiation in a wavelength band dependent on viewing angle; printing an imaging composition onto a portion of the array in a configuration of an image; shifting the wavelength band of radiation diffracted and changing the refractive index by the printed portion of the array so that the printed portion diffracts radiation at a different wavelength band and/or reflectivity intensity from a remaining portion of the array; and fixing the printed portion of the array, such that the printed portion of the array diffracts radiation and exhibits the image.

Also included in the present invention is a method of producing an image that diffracts radiation comprising printing a dispersion of particles onto a substrate in a configuration of an image, wherein the particles self-assemble into an ordered periodic array within the image; and coating the particles with an overcoat composition to fix the ordered periodic array of particles within the image, such that the image diffracts radiation at a detectable wavelength band.

DETAILED DESCRIPTION OF THE INVENTION

The present invention includes a method of producing an image that diffracts radiation. An imaged member is produced by printing an imaging composition onto a portion of an ordered periodic array of particles and fixing the printed array in a matrix material. Any suitable printing technique may be used, such as xerographic printing, ink jet printing, flexographic printing, silk screening, gravure printing, or intaglio printing. In the embodiments described herein, the printed portion may correspond to an image with the remaining portion that was not printed serving as a background in the imaged member. Alternatively, the printed portion may be a background to an image produced in the remaining portion of the imaged member. The imaging composition shifts the wavelength band of radiation diffracted and/or changes the refractive index of the printed portion of the array, such that the difference in optical properties between the printed portion and a remainder of the array is detectable as an image. The image may be detectable, for example, to authenticate or identify an article to which it is applied, or it may be decorative. The image is detectable by exposing the imaged member to radiation and detecting radiation reflected from the imaged member as an image. Each of the exposing radiation and reflected radiation may be in the visible or non-visible spectrum. In certain embodiments, an image produced according to the present invention may be detectable with the naked eye. In other embodiments, the image is detectable by using an optical device (such as a spectrophotometer) to retrieve or view the image.

As described herein, an ordered periodic array of particles is printed with an imaging composition to produce a printed member. The printed member is subsequently treated to produce an imaged member comprising an ordered periodic array of particles held in a matrix. By ordered periodic array of particles, it is meant an array of particles that diffracts radiation. Parallel layers or planes formed by the periodic array of particles interact with incident radiation in accordance with Bragg's law. The diffracted light is goniochromatic, i.e., the wavelength (color) depends on the viewing angle. The diffraction wavelength of the light at a given angle is proportional to the distance between the Bragg planes formed by the periodic array of particles, which is proportional to the particle diameter for close-packed spheres. The diffraction wavelength of an imaged member of the present invention also depends on the effective refractive index of the imaged member. The effective refractive index of the imaged member is closely approximated as a volume average of the refractive index of the materials of the imaged member, including the particles and the matrix surrounding the particles. The intensity of the diffracted light is dependent on the refractive index variation within the imaged member as dictated by the arrangement of the particles and the surrounding matrix. In general, an imaged member of the present invention includes alternating planes, such as planes taken through the centers of the particles and planes taken through the particle peripheries. The planes of the particle centers generally are composed predominately of the particle composition, and the planes of the particle peripheries generally are composed of matrix composition, as well as the particle composition. Due to the difference in compositions of the alternating layers, the alternating layers also have different indices of refraction. The quantity of alternating layers in the array of particles and matrix and the refractive index contrast between the alternating layers influence the diffraction intensity. More particle layers produce greater diffraction intensity. Higher refractive index contrast between alternating layers also produces greater diffraction intensity. Higher refractive index contrast between alternating layers can be achieved by using particles and matrix having a relatively large difference in their respective indices of refraction. Alternatively, directionally expanding the particles and/or the matrix can alter the layered structure and increase the refractive index contrast between the layers.

The particles may have a core-shell structure where the core is produced from a different composition from the shell composition. Suitable compositions for the particle core include polymers, such as polystyrene, polyurethane, acrylic polymers, alkyd polymers, polyester, siloxane-containing polymers, polysulfides, epoxy-containing polymers, or polymers derived from epoxy-containing polymers, as well as inorganic materials, such as metal oxides (e.g., alumina, silica, or titanium dioxide) or semiconductors (e.g., cadmium selenide). Suitable compositions for the shell include organic polymers (e.g., polystyrene, polyurethane, acrylic polymers, alkyd polymers, polyester, siloxane-containing polymers, polysulfides, epoxy-containing polymers, or polymers derived from epoxy-containing polymers), with the composition of the particle shell differing from the matrix material for a particular array of the core-shell particles. The shell material may be non-film-forming (i.e., cured or crosslinked), meaning that the shell material remains in position surrounding a particle core without forming a film of the shell material so that the core-shell particles remain as discrete particles within the polymeric matrix. As such, the imaged member may include at least three general regions: the matrix, the particle shell, and the particle core. Alternatively, the shell composition may be film-forming, whereby the shell composition forms a film around the cores. The core composition and the shell composition have different indices of refraction. In addition, the refractive index of the shell may vary as a function of the shell thickness in the form of a gradient of refractive index through the shell thickness. The refractive index gradient may be a result of a gradient in the composition of the shell through the shell thickness. For particles that are generally spherical, the diameter of the core may constitute 85 to 95% of the total particle diameter or 90% of the total particle diameter with the shell constituting the balance of the particle diameter and having a radial thickness dimension. Alternatively, the particles may have a generally unitary structure. As used herein, "unitary structure" refers to a feature of the particles, each having a generally uniform structure without component structures, although the composition thereof may vary through the unitary particles, such as may occur upon diffusion of solvent or matrix therein.

The particle cores may be produced via emulsion polymerization of core-precursor monomers in the presence of a surfactant, yielding a dispersion of the cores. Suitable surfactants for dispersion of organic polymer particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. Shell monomers are added to the core particle dispersion, along with a surfactant (as described above) such that the shell monomers polymerize onto the core particles. The core-shell particles are purified from the dispersion by techniques such as ultrafiltration, dialysis, or ion-exchange to remove undesired materials, such as unreacted monomer, small polymers, water, initiator, surfactant, unbound salt, and grit (agglomerated particles) to produce a monodispersion of charged core-shell particles. Ultrafiltration is particularly suitable for purifying charged particles. When the particles are in dispersion with other materials, such as salts or by-products, the repelling forces of the charged particles can be mitigated; therefore, the particle dispersion is purified to essentially contain only the charged particles, which then readily repel each other and form an ordered periodic array on a substrate as described below.

Unitary-structured particles may be produced by dispersing monomers with initiators in solution to produce unitary particles as described above with regard to preparing the cores of the core-shell particles. A dispersion of the unitary particles is purified as described above to produce a dispersion of only the charged unitary particles, which then form an ordered array on a substrate as described below.

Upon removal of the excess raw material, by-products, solvent, and the like, electrostatic repulsion of the charged particles causes the particles to self-assemble into an ordered periodic array. The purified dispersion of particles is applied to a substrate and dried. The dispersion of the particles applied to the substrate may contain 10-70 vol. % of charged particles or 30-65 vol. % of charged particles. The dispersion can be applied to the substrate by dipping, spraying, brushing, roll-coating, curtain coating, flow-coating, die-coating or by printing via xerographic printing, ink jet printing, flexographic printing, silk screening, gravure printing, or intaglio printing to a desired thickness. The wet coating may have a thickness of 4-50 microns, such as 20 microns. Upon drying, the material contains essentially only the particles that have self-assembled in an ordered periodic array.

According to the present invention, in general, printing of an imaging composition onto the ordered periodic array in the configuration of an image alters the optical properties of the printed member in the printed portion by increasing inter-particle spacing and/or changing refraction index difference between the particles and the matrix. As a result, the wavelength of diffraction of the ordered periodic array of particles shifts and the intensity of radiation reflected thereby changes upon printing of the imaging composition so that the image is detectable in the printed portion as having a different diffraction wavelength and/or intensity of reflected radiation.

In a first embodiment of the present invention, the imaging composition is a curable matrix composition comprising monomers (which may include pre-polymeric components) for producing a polymeric matrix. The matrix may be an organic polymer such as an acrylic polymer, polystyrene, polyurethane, alkyd polymer, polyester, siloxane-containing polymer, polysulfide, epoxy-containing polymer, and/or polymer derived from an epoxy-containing polymer. The imaging composition includes monomeric (including polymeric precursors) components of the matrix, which may be dispersed or dissolved in a solvent. The monomer-containing imaging composition is printed onto the ordered periodic array of particles in the configuration of an image. The monomers fill the interstitial gaps between the particles in the array in the location of printing (the printed portion), which may urge the particles in the printed portion apart from each other and change the inter-particle distance, thereby shifting the Bragg conditions and the resulting wavelength of diffraction. The monomers also may diffuse into the particles, thereby swelling the particles and further increase the inter-particle distance. The imaging composition also shifts the refractive index difference between the alternating planes in the printed portion, thereby changing the refractive index contrast and intensity of reflected radiation in the printed portion.

Diffusion of monomers into the particles may be enhanced by heating the array to increase the rate of diffusion of materials from the imaging composition into the particles. The imaging composition may also include a solvent to enhance the rate and/or concentration of monomers diffusing into the particles.

The printed array having an image printed thereon is coated with a curable clearcoat composition similar to the composition disclosed in U.S. Pat. No. 6,894,086 (incorporated herein by reference) to interpenetrate the array of particles with the curable clearcoat composition, which is then cured. By coating, it is meant that the curable matrix composition covers at least substantially the entirety of the array and at least in part fills the interstitial spaces between the particles. The curable clearcoat composition may be applied by spraying, brushing, roll-coating, gravure coating, curtain coating, flow-coating, slot-die coating, xerographic printing, ink jet printing, flexographic printing, silk screening, gravure printing, or intaglio printing, or the like. The coated array is subjected to curing, such as by UV radiation, to polymerize the monomers of the imaging composition as well as the clearcoat composition. Alternatively, curing of the imaging composition and clearcoat composition may be conducted in separate steps. The resulting imaged member includes a printed portion that received the imaging composition and a background portion that did not receive the imaging composition. The printed portion of the imaged member diffracts radiation at a different wavelength band from the background portion and at a different intensity of reflection than the background portion. By different wavelength band or different wavelength, it is meant that there is a discernable difference in the wavelength or band of wavelengths diffracted by the two portions of the imaged member. The difference in diffraction wavelength may be visible to the human eye or may be detectable by an optical device, such as a spectrophotometer or the like. The imaged member may be used in place on the substrate or may be removed therefrom as a self-supporting film for use on another support.

In a second embodiment, an ordered periodic array of particles is printed with an imaging composition to alter the inter-particle spacing and/or refractive index of the printed portion as described above and is cured prior to applying any subsequent coatings in order to fix the printed portion of the array. The cured printed array is then overcoated with a coalescing composition that coalesces the particles in the background portion, rendering the background portion substantially colorless. Suitable coalescing compositions include organic solvents or low molecular weight monomers. By substantially colorless, it is meant that the background portion does not exhibit color that is discernable to the naked eye, but may appear transparent, semi-transparent or opaque depending upon the degree of coalescence. The printed array with coalesced background portion may be used as an imaged member as is or it may be overcoated with a clearcoat coating composition as described above. The imaged member may be used in place on the substrate or may be removed therefrom as a self-supporting film for use on another support.

Alternatively, instead of coalescing the background portion, the cured printed array may be treated so as to disturb and/or remove the particles in the background portion to prevent the background portion from diffracting radiation. An ordered periodic array of particles that is not cured may be disturbed by various techniques including, for example, by applying a solvent to the array that at least partially dissolves the particles or by mechanically disrupting the particles. The disturbed particles may be removed from the cured printed array, such that only the imaged portion of the array remains intact. The cured printed array with removed (or disturbed) background portion may be used as an imaged member as is or it may be overcoated with a clearcoat coating composition as described above. The imaged member may be used in place on the substrate or may be removed therefrom as a self-supporting film for use on another support.

In a third embodiment, an ordered periodic array of particles is first coated with a curable matrix composition having monomers that are suitable for diffusion into the particles. The curable matrix composition may be coated onto the array in any manner that does not disrupt the array, such as by spraying, roll-coating, curtain coating, flow-coating, die-coating, xerographic printing, ink jet printing, flexographic printing, silk screening, gravure printing, or intaglio printing, or the like. The curable matrix composition may or may not be cured. The components of the curable matrix composition may be selected to not be diffusible into the particles without further treatment. The array bearing the curable matrix composition is printed with an imaging composition that swells the particles (e.g., a solvent or monomers), thereby allowing diffusion of the monomers into the printed portion of the array and increasing the inter-particle spacing and refractive index contrast of the printed portion. The printed array is cured, thereby fixing the inter-particle spacing in the printed portion as well as fixing the particles within the printed and background portions within the matrix material. The printed array may be used as an imaged member as is or may be overcoated with a clearcoat coating composition as described above. The imaged member may be used in place on the substrate or may be removed therefrom as a self-supporting film for use on another support.

In a fourth embodiment of the invention, instead of assembling an array of particles on a substrate which is subsequently printed, a purified dispersion of similarly charged particles is printed directly onto a substrate in the configuration of an image. The printed dispersion is dried so that the particles self-assemble in an ordered periodic array having a configuration of an image. The substrate bearing a printed image is coated with curable matrix composition that includes monomers or other polymer precursor materials, as described above. The matrix composition is cured to fix the printed image in a film of cured matrix material. The film may be removed from the substrate as a self-supporting form for application to another support. Alternatively, the film with printed image may be produced directly on an end-use support.

By using conventional printing techniques such as ink jet printing, a highly detailed image may be produced in the imaged member to create mass customization of images. It should be appreciated that the embodiments described herein may include an imaged member having more than one image portion. For example, different imaging compositions may be printed onto an ordered periodic array of particles and which have different effects on the respective printed portions. A monomeric imaging composition that readily diffuses into the particles could be used in printing a first portion of the array, and a monomeric imaging composition that does not diffuse as readily into the particles could be used in printing a second portion of the array, either at the same time or sequentially. The swelling of the particles will be greater in the first portion than in the second portion so that the imaged member has two portions that diffract radiation differently from each other. Alternatively, a second portion of an array may be printed at a later time than a first portion so that the amount of swelling of the particles between the first and second portions differs, thereby creating different diffraction properties. In this manner, a multi-color image may be created in an imaged member. By controlling the swelling of the particles, a red image, a blue image, and a green image may be produced in the imaged member. Upon curing, a full-color image is visible in the multi-imaged member. A multi-color image as described herein is not limited to red, blue, and green images to create a full-color image. Multi-color images may be used with two-color (two-tone) images or more than three-color images. Likewise, the images may be the positive of an image or the negative of an image. It is also possible to layer images of differing colors to create full-color images or images that move from invisible to visible when the viewing angle of the item is changed.

The imaged members of the present invention may be provided on a support film or may be removed from a support film and be comminuted into individually imaged planchetts (large flakes, with planar dimensions on the order of 1-10 mm) or smaller flakes. Alternatively, the imaged members may be produced directly on an article, wherein a surface of the article functions as a substrate onto which the imaged member is produced.

The imaged members produced according to the present invention also may be applied to an article or other physical structure by a variety of techniques, such as using adhesives to attach a film bearing an imaged member to an article (as a decal or the like) or by hot stamping of a film bearing an imaged member or delivering an imaged member to an article. The imaged members may be incorporated into woven articles (such as currency) by weaving threads bearing the imaged members into the woven material. Alternatively, the imaged members may be compounded into material for producing the article (such as a resinous material or pulp-type material). The article may be molded (including injection-molding) or extruded (including hot melt extrusion), whereby the imaged member is co-extruded with the article forming material. The imaged members of the present invention may also be provided on or incorporated into heat-shrinkable sleeves for wrapping around articles.

The imaged members produced according to the invention having an image may be used in marking devices, including documents of value, articles of manufacture and their packaging, and credentials documents. By using printing techniques to produce the imaged members, images may be rapidly customized such as to create credentials and the like that require customized images (such as of a person's face) which are not readily copied. Examples of credentials which may bear the images produced according to the present invention include drivers' licenses, identification cards (government, corporate, and educational), passports, visas, marriage certificates, hospital bracelets, and diplomas. Examples of documents of value include currency, credit cards, compliance certificates, collectors' items and trading cards, deeds, titles or registrations (e.g., automotive), compliance decals, tickets (e.g., travel, events or parking), tax stamps, coins, postage stamps, checks and money orders, stationery, lottery tickets, chips and/or tokens, controlled items (e.g., evidence), key cards, keys, tracing and tracking items, and as a portion of barcodes. Articles of manufacture or packaging of articles of manufacture may include aircraft parts, automotive parts such as vehicle identification numbers, pharmaceutical products and personal care products, recorded media, clothing and footwear, electronic devices, batteries, ophthalmic devices, alcohol, food items, printing inks and printing consumables, writing implements, luxury items such as luggage and handbags, sporting goods, software and software packaging, tamper seals, artwork (including original works of art), construction materials, munitions, toys, fuel, industrial equipment, biological materials and living goods, jewelry, books, antiques, safety items (e.g., fire extinguishers and filtration devices), carpets and other furnishings, chemicals, medical devices, paint and coatings, and windows and transparencies. These examples are not meant to be limiting and are only a sampling of devices that may bear an image according to the present invention. These exemplary uses of an image are not meant to be limiting.

EXAMPLES

Example 1

Array of Core-Shell Particles

A dispersion of polystyrene-divinylbenzene core/styrene-methyl methacrylate-ethylene glycol dimethacrylate-divinylbenzene shell particles in water was prepared via the following procedure.

Sodium bicarbonate (4.9 g) from Aldrich Chemical Company, Inc., was mixed with 4090 g deionized water and added to a 12-liter reaction kettle equipped with a thermocouple, heating mantle, stirrer, reflux condenser and nitrogen inlet. The mixture was sparged with nitrogen for 43 minutes with stirring and then blanketed with nitrogen. Aerosol MA80-I (46.8 g in 410 g deionized water) from Cytec Industries, Inc., was added to the mixture with stirring followed by a 48 g deionized water rinse. The mixture was heated to approximately 50° C. using a heating mantle. Styrene monomer (832.8 g), available from Aldrich Chemical Company, Inc., was added with stirring. The mixture was heated to 60° C. Sodium persulfate from the Aldrich Chemical Company, Inc. (12.5 g in 144 g deionized water) was added to the mixture with stirring. The temperature of the mixture was held constant for 40 minutes. Under agitation, divinylbenzene from Aldrich Chemical Company, Inc., (205.4 g) was added to the mixture and the temperature was held at approximately 60° C. for 2.3 hours. Brij 35 (polyoxyethylene (23) lauryl ether) from the Aldrich Chemical Company, Inc. (5.0 g in 100 g deionized water) was added to the mixture with stirring. Next, sodium persulfate from the Aldrich Chemical Company, Inc. (9.1 g in 900 g deionized water) was added to the mixture with stirring. A mixture of styrene (200 g), methyl methacrylate (478.8 g), ethylene glycol dimethacrylate (48 g) and divinylbenzene (30.2 g), all available from Aldrich Chemical Company, Inc., was added to the reaction mixture with stirring. Sipomer COPS-I (3-Allyloxy-2-hydroxy-1-propanesulfonic acid 82.7 g) from Rhodia, Inc. Cranbury, N.J., was added to the reaction mixture with stirring and was followed by a (100 g) deionized water charge. The temperature of the mixture was maintained at 60° C. for approximately 4.0 hours.

The resulting polymer dispersion was filtered through a five-micron filter bag. The polymer dispersion was ultrafiltered using a 4-inch ultrafiltration housing with a 2.41-inch polyvinylidine fluoride membrane, both from PTI Advanced Filtration, Inc., Oxnard, Calif., and pumped using a peristaltic pump at a flow rate of approximately 170 ml per second. Deionized water (2985 g) was added to the dispersion after 3000 g of ultrafiltrate had been removed. This exchange was repeated several times until 11349 g of ultrafiltrate had been replaced with 11348 g deionized water. Additional ultrafiltrate was then removed until the solids content of the mixture was 44.8 percent by weight.

The material was applied via slot-die coater from Frontier Industrial Technology, Inc., Towanda, Pa. to a 2 mil thick polyethylene terephthalate (PET) substrate and dried at 180° F. (82° C.) for 40 seconds to a dry thickness of approximately 7 microns. The resulting material diffracted light at 518 nm measured with a Cary 500 spectrophotometer from Varian, Inc.

Example 2

Curable Acrylic Matrix

An ultraviolet radiation curable organic composition was prepared via the following procedure. Diphenyl(2,4,6-trimethylbenzoyl)phosphine oxide/2-hydroxy-2-methyl-propiophenone (0.15 g), 50/50 blend from Aldrich Chemical Company, Inc., Milwaukee, Wis., was added with stirring to 5.0 g of polyethylene glycol (600) diacrylate from Sartomer Company, Inc., Exton, Pa.

Example 3

Curable Acrylic Matrix

An ultraviolet radiation curable organic composition was prepared via the following procedure. Diphenyl(2,4,6-trimethylbenzoyl)phosphine oxide/2-hydroxy-2-methyl-propiophenone (0.15 g), 50/50 blend from Aldrich Chemical Company, Inc., Milwaukee, Wis., was added with stirring to 5 g of propoxylated (2) neopentyl glycol diacrylate from Sartomer Company, Inc., Exton, Pa.

Example 4

Fixed Array

The UV curable coating composition prepared in Example 2 was deposited to the particles from Example 1. A piece of 2 mil thick PET film was then placed upon the deposited coating composition from Example 2 so that the array of Example 1 was entirely covered. A roller was used on the top side of the PET substrate to spread out and force the coating composition from Example 2 into the interstitial spaces of the array from Example 1. The sample was heated at 250° F. (121° C.) until color change was observed and then ultraviolet radiation cured using a 100 W mercury lamp. The two layers of PET were then separated. This resulted in a film that had a green color when viewed perpendicular or 0 degrees to the observer and a blue color when viewed at 45 degrees or greater to the observer.

Example 5

Printing on an Array of Core-Shell Particles

The UV curable coating composition prepared in Example 3 was injected with a syringe into a piezoelectric ink jet cartridge. The ink jet cartridge was then placed in a printer system (a Materials Printing System, Fujifilm Dimatix™ model #DMP-2800, Santa Clara, Calif.) An image consisting of a logo, text, and a person's portrait in a 1-bit bitmap format was loaded into the printed system software. The printer system deposited picoliter amounts of the composition of Example 3 to the interstitial spaces of the substrate described in Example 1 to create an image. A piece of 2 mil thick PET film was then placed upon the deposited image. The sample was heated at 250° F. (121° C.) until color shift was observed and then ultraviolet radiation cured using a 100 W mercury lamp. The two layers of PET were then separated, yielding an imaged film. The image had a green color and blue background when viewed perpendicular or 0 degrees to the observer and a blue color and colorless background when viewed at 45 degrees or greater to the observer.

The UV curable coating composition prepared in Example 3 was deposited on the cured image. A piece of 2 mil thick PET film was then placed upon the deposited composition from Example 3 so that the material was entirely covered. A roller was used on the top side of the PET substrate to spread out and allow the material from Example 3 to penetrate the film. The sample was then ultraviolet radiation cured using a 100 W mercury lamp. The two layers of PET were then separated. The image had a more intense green color and blue background when viewed perpendicular or 0 degrees to the observer and blue color and colorless background when viewed at 45 degrees or greater to the observer.

Example 6

Printing on an Array of Fixed Core-Shell Particles

The UV curable coating composition prepared in Example 3 was injected with a syringe into a piezoelectric ink jet cartridge, which was then placed in the printer system with a 1-bit bitmap format as used in Example 5. The printer system deposited picoliter amounts of material in Example 3 to penetrate the substrate described in Example 4 and created an image. A piece of 2 mil thick PET film was then placed upon the deposited image. The sample was heated at 250° F. (121° C.) until color shift was observed and then ultraviolet radiation cured using a 100 W mercury lamp. The two layers of PET were then separated.

The resulting image in the film had a green color and blue background when viewed perpendicular or 0 degrees to the observer and a blue color and colorless background when viewed at 45 degrees or greater to the observer.

The UV curable coating composition prepared in Example 3 was deposited on the imaged film. A piece of 2 mil thick PET film was then placed upon the deposited material from Example 3 so that the material was entirely covered. A roller was used on the top side of the PET substrate to spread out and allow the material from Example 3 to penetrate the film. The sample was then ultraviolet radiation cured using a 100 W mercury lamp. The two layers of PET were then separated. The image had a more intense green color and blue background when viewed perpendicular or 0 degrees to the observer and blue color and colorless background when viewed at 45 degrees or greater to the observer.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

The invention claimed is:

1. A method of printing an image that diffracts radiation comprising:
   assembling an ordered periodic array of particles on a substrate, wherein the array of particles diffracts radiation in a wavelength band dependent on viewing angle;
   printing an imaging composition onto a portion of the array in a configuration of an image;
   shifting the wavelength band of radiation diffracted and/or changing the refractive index by the printed portion of the array so that the printed portion diffracts radiation at a different wavelength band and reflectivity intensity from a remaining portion of the array; and fixing the printed portion of the array, such that the printed portion of the array diffracts radiation and exhibits the image.

2. The method of claim 1, wherein the imaging composition changes the dimension and refractive index of the particles in the printed portion of the array, thereby shifting the wavelength band diffracted by the printed portion of the array.

3. The method of claim 2, wherein the imaging composition comprises monomers that change the dimension and refractive index of the particles in the printed portion of the array.

4. The method of claim 3, wherein the imaging composition further comprises a solvent that changes a dimension of the particles.

5. The method of claim 2, wherein the particles have a core-shell structure and the imaging composition changes the dimension and refractive index of the particle shells.

6. The method of claim 2, further comprising heating the array to enhance the changing of the dimension of the particles by the imaging composition.

7. The method of claim 2, further comprising coating the array with an overcoat composition.

8. The method of claim 7, wherein the overcoat composition is curable, said method further comprising curing the overcoat composition to produce a film exhibiting the image in the printed portion and a background in the remaining portion.

9. The method of claim 7, wherein the overcoat composition coalesces the particles in the array that are in the printed portion to produce a film exhibiting the image in the printed portion and the remaining portion being substantially colorless.

10. The method of claim 2, further comprising removing the remaining portion of the array.

11. The method of claim 1, further comprising coating the array with an overcoat composition prior to printing with the imaging composition.

12. The method of claim 11, wherein the fixing step comprises fixing the printed portion, the remaining portion, and the overcoat composition.

13. The method of claim 1, wherein the printing step comprises delivering the imaging composition via a printer.

14. The method of claim 1, wherein the printing step comprises delivering the imaging composition via xerographic printing, ink jet printing, flexographic printing, silk screening, gravure printing, or intaglio printing.

* * * * *